G. E. PRITCHARD.
PEA AND BEAN SEPARATOR.
APPLICATION FILED AUG. 2, 1917.
1,262,559.
Patented Apr. 9, 1918.
3 SHEETS—SHEET 1.
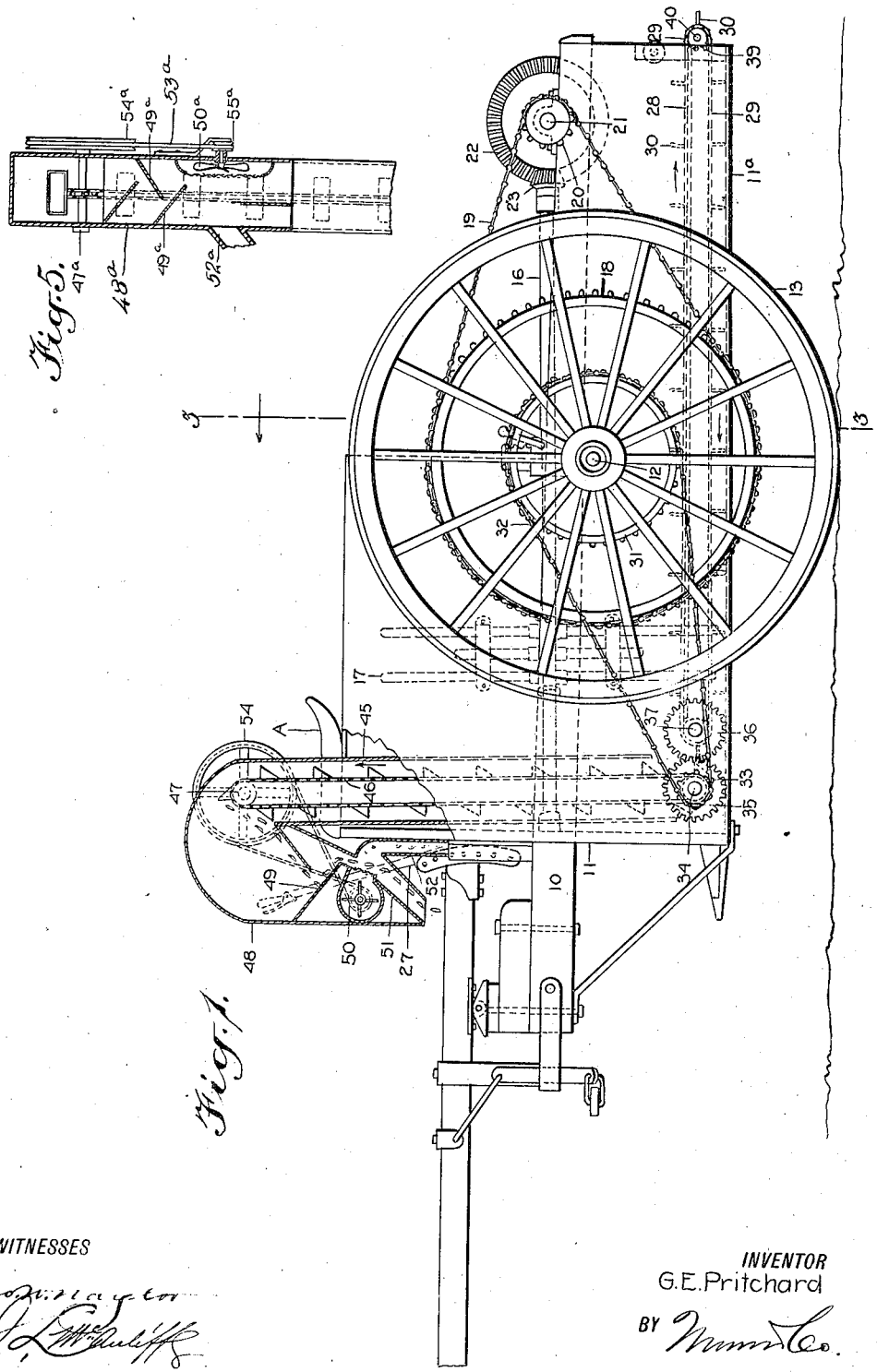
WITNESSES
INVENTOR
G.E. Pritchard
BY
ATTORNEYS

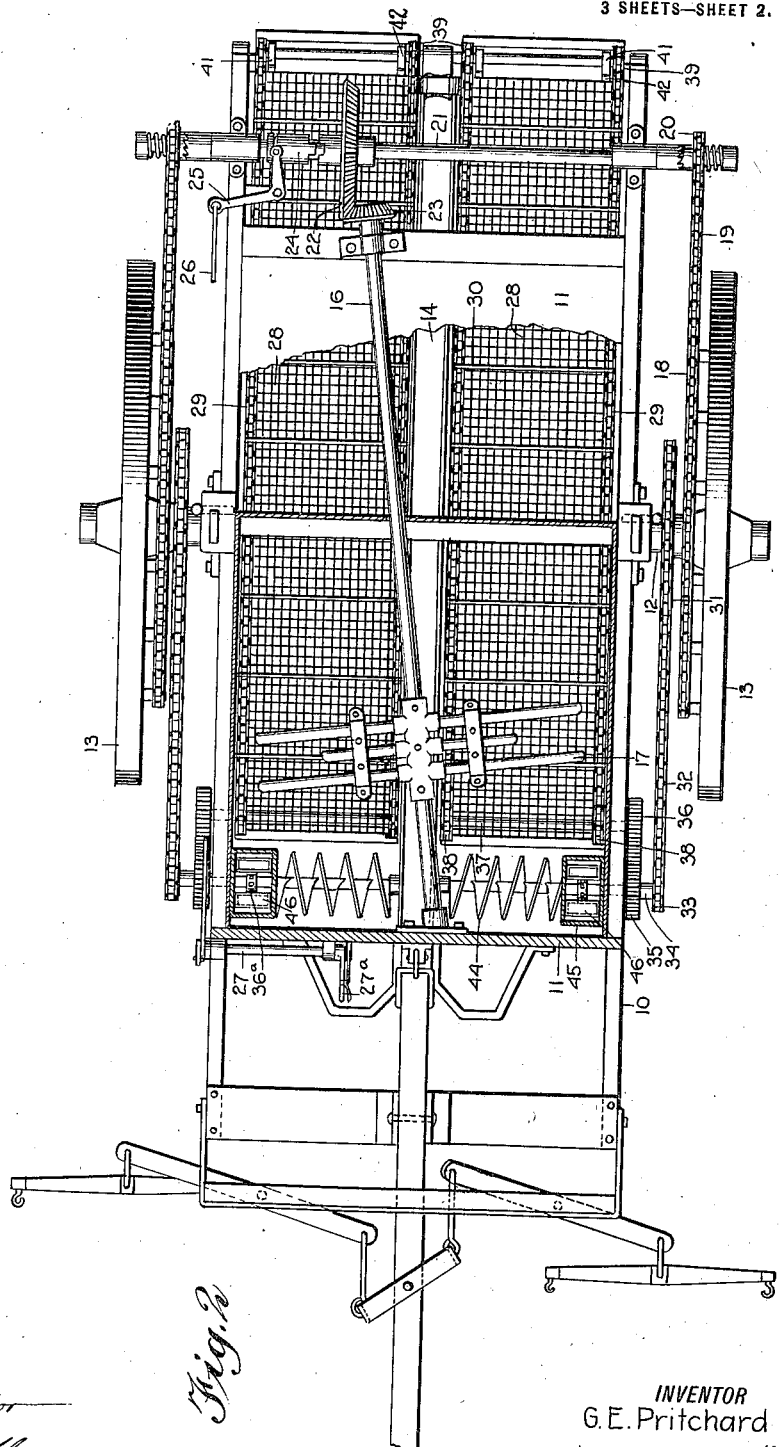

G. E. PRITCHARD.
PEA AND BEAN SEPARATOR.
APPLICATION FILED AUG. 2, 1917.
1,262,559.
Patented Apr. 9, 1918.
3 SHEETS—SHEET 3.
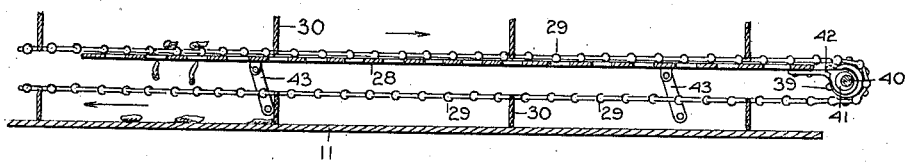
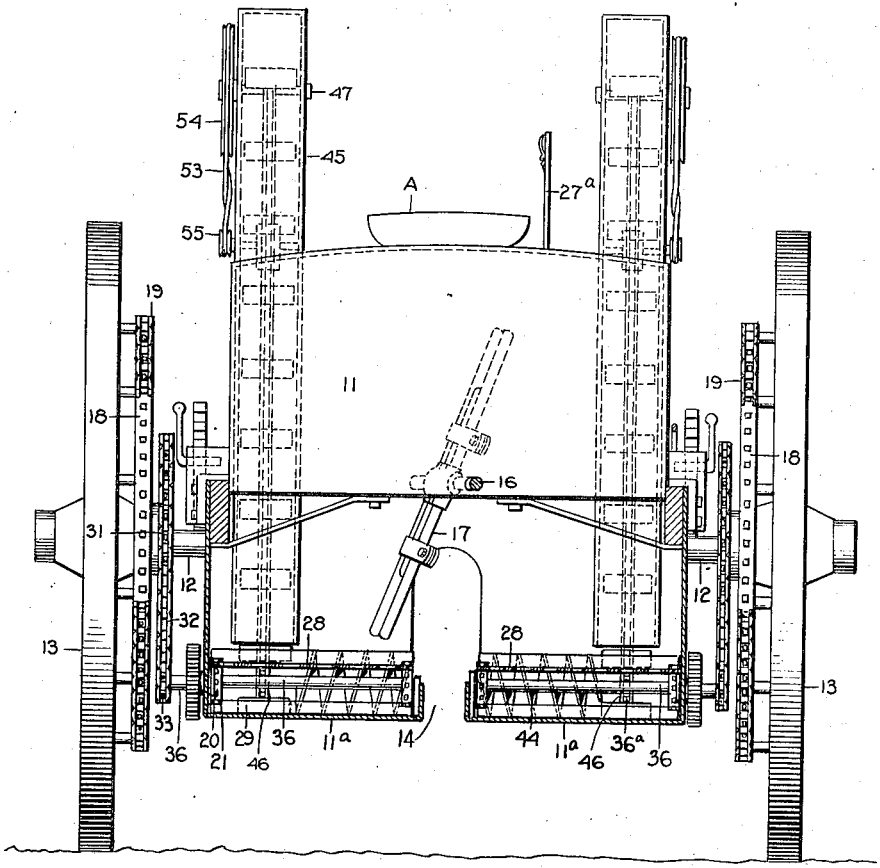
WITNESSES
INVENTOR
G. E. Pritchard
ATTORNEYS

UNITED STATES PATENT OFFICE.

GEORGE E. PRITCHARD, OF ELIZABETH CITY, NORTH CAROLINA.

PEA AND BEAN SEPARATOR.

1,262,559. Specification of Letters Patent. Patented Apr. 9, 1918.

Application filed August 2, 1917. Serial No. 184,077.

*To all whom it may concern:*

Be it known that I, GEORGE E. PRITCHARD, a citizen of the United States, and a resident of Elizabeth City, in the county of Pasquotank and State of North Carolina, have invented a new and Improved Pea and Bean Separator, of which the following is a full, clear, and exact description.

My invention relates to a machine especially adapted for harvesting and threshing peas and beans. More particularly the invention relates to that type of machine adapted to be drawn over a field and provided with guide means to direct the vines of a row properly into the machine and employing a beater or the like to thresh the peas or beans, means being provided for moving the peas or beans rearwardly in the machine. An example of the machine of the type referred to is found in United States Letters Patent, No. 1,117,904, granted to me November 17, 1914.

The general object of my present invention is to provide improved means for conveying, lifting and cleaning the threshed peas or beans.

A more specific object of the invention is to provide a machine of the indicated character improved in various particulars with a view to promote efficiency of operation, as well as simplicity of adjustment and control.

The nature of the invention and its advantages will clearly appear from the particular description following.

Reference is to be had to the accompanying drawings forming a part of this specification in which similar reference characters indicate corresponding parts in all the views, it being understood that the drawings are merely illustrative of one example of the invention.

Figure 1 is a side elevation of a machine embodying my invention, parts being broken away and others shown in section;

Fig. 2 is a sectional plan view;

Fig. 3 is a transverse vertical section on the line 3—3, Fig. 1;

Fig. 4 is a detail in longitudinal vertical section showing the screen and conveyer in carrying the peas or beans rearwardly;

Fig. 5 is a rear end view of an elevator hopper, parts being broken out and others in section, the view illustrating a modified form of the fanning means.

In constructing a practical embodiment of my invention in accordance with the illustrated example, a suitable vehicle frame 10 is provided having a body structure 11 and an axle 12 with wheels 13 thereon, whereby the machine may be drawn over a field. In the illustrated construction also, the machine includes a longitudinal opening or slot 14 in the bottom of the body 11 and extending from the front thereof to guide the vines into the machine. The illustrated construction also includes a transversely revoluble beater 17 on a beater shaft 16, all of which parts are similar to those shown in my patent above mentioned. The beater shaft 16 may be driven in any suitable manner, there being shown a sprocket 18 on each wheel 13 over which a belt 19 runs, the belts running also over sprockets 20 on a transverse shaft 21 turning in suitable bearings at the rear end of the machine. On the shaft is any approved clutch 24 provided with a clutch lever 25 from which a connecting link 26 runs forwardly to a short transverse shaft 27 mounted at the front of the machine and having a controlling lever 27ª operable from the driver's seat A.

Inasmuch as the features at each side of the machine are alike, the description of those at one side will answer for both. The beater 16 causes the threshed peas to be thrown to the sides of the body 11 and onto screens or riddles 28, there being one of the latter at each side, the body at the bottom being depressed at the sides to produce in effect troughs 11ª. The screens are conventionally indicated in Fig. 2; in practice they are formed as shown in Fig. 4 from durable screen plates having openings close together. An endless conveyer is arranged in connection with each trough 11ª and each preferably comprises a chain 29 and cross bars 30. The upper run of the conveyer travels rearwardly on top of the screen 28 while the return run travels forwardly beneath the screen and with the cross bars 30 of the conveyer constituting drags.

Thus, the conveyer will carry any particles of vines or the like to the rear and out of the body 11 while the threshed peas will fall through the screen to the bottom of the trough 11ª to be carried forwardly by the conveyer.

To actuate the conveyer and vibrate the screen or riddle 28, drive connections are established with the axle 12 on one or each side of which is a sprocket 31 over which a chain 32 runs, and runs also over a sprocket 33 on a transverse shaft 34 turning in suitable bearings at the front of the body 11 forward of the screens 28. On the shaft 34 a sprocket pinion 35 is provided meshing with a fixed pinion 36 on a transverse shaft 37 carrying sprocket wheels 38 about which the front ends of the chains 29 run. The chains 29 at the rear ends run over sprockets 39 on a transverse shaft 40 at the rear of the machine. Any suitable connections may be established between the shaft 40 and the screens 28 to vibrate the latter, there being indicated one means for the purpose, consisting of eccentrics 41 on the shaft 40 having the arm 42 thereof secured to the rear end of the screen. Said screen may be rockably supported in any manner usual with devices of this kind, there being indicated links 43.

The peas carried forwardly to the front of the troughs 11$^a$ by the conveyer are elevated and cleaned by the means next described. On the shaft 34 in front of the screen 28 is a conveyer screw 44 which acts to carry peas laterally in the trough 11 to an elevator designated generally by the numeral 45, the elevator including a bucket chain 46 running over sprockets 36$^a$ on the shaft 36 and upwardly and over sprockets on a shaft 47 at the top of the elevator, so that the buckets will dump the elevated material into a hopper or spout 48. The hopper 48 is provided with fanning means to clean the threshed material of chaff. In the form shown in Fig. 1 oppositely disposed inclined baffles 49 are provided from which the material gravitates past a fan 50, the peas falling to a discharge spout 51 to be directed in practice to any suitable receptacle (not shown) or to a bag or the like, while the chaff is directed rearwardly to a discharge spout 52. The fan 50 obviously may be driven in any suitable manner, there being indicated for the purpose a belt 53 running over a pulley 54 on the shaft 47 and over a pulley 55 on the fan shaft.

With the construction shown in Fig. 5, the hopper 48$^a$ has baffles 49$^a$ extending alternately from the sides of the hopper instead of from the front and back as in Fig. 1, and the fan 50$^a$ turns on a transverse axis to discharge the chaff through a lateral spout 52$^a$, while the peas gravitate to the bottom of the spout. In this form the shaft 47$^a$ corresponding with the shaft 47 carries a pulley 54$^a$ over which a belt 53$^a$ runs, the belt running also over a pulley 55$^a$ on the fan shaft.

With a machine constructed as described high efficiency is attained in the conveying of the peas or the like, the separation of the same from vines, and the proper cleaning. There is also attained a compact structure, the screens and conveying means, as well as their drive means, occupying the minimum space, while permitting of the screens and the associated conveyers being made of an ample area to produce an effective separation of the peas from the vines during the rearward travel of the conveyers. It will be obvious also that the construction involves no complicated parts so that adjustment and repair can be readily effected.

I wish to state in conclusion that although the illustrated example constitutes a practical embodiment of my invention, I do not wish to limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a pea and bean separator having a body provided with means to guide the vines thereto and formed with depressed longitudinal troughs therein along the sides of the body; threshing means in the body, screens in the said troughs on which the threshed peas or the like are received from the threshing means, endless conveyers having the upper runs thereof disposed on top of the screens and the lower runs disposed in said troughs beneath the screens, means to actuate said conveyers to cause the upper runs to travel rearwardly, and the lower runs forwardly, said conveyers having cross bars constituting drags to move forwardly to the front ends of the troughs the peas or the like passing through the screens, and means in said troughs in front of said screens and conveyers to conduct the peas or the like from the troughs.

2. In a pea and bean separator having a body provided with means to guide the vines thereto; threshing means in the body, screens in the body along the sides on which the peas or the like are received from the said threshing means, and conveyer means above and below the screens and adapted to give a rearward movement to the material received by the screns and while said material is on the screens, and adapted to carry forwardly beneath the screens the material passing through the latter.

3. In a pea and bean separator of the class described, having a body in which, at the opposite sides, the threshed material is received; endless conveyers disposed longitudinally at the sides of the body, screens along the sides of the body between the upper and lower runs of the said conveyers, the said screens being vibratable, means to actuate the conveyers to cause the upper run to travel over the screens in one direction and the under run beneath the screens in the opposite directions, and means to vibrate the screens while the conveyers are being actuated.

4. In a pea and bean separator having a body provided with means to guide the vines thereto and formed with depressed longitudinal troughs therein along the sides of the body; threshing means in the body, screens along the sides of the body at said troughs and adapted to receive the threshed material from the threshing means, means to conduct forwardly to the ends of the troughs the material passing through the screens, and lateral conveying means in the troughs in front of the said screens and to which the material is delivered by the second mentioned means.

5. In a pea and bean separator having a body provided with means to guide the vines thereto and formed with depressed longitudinal troughs therein along the sides of the body; threshing means in the body, screens along the sides of the body at said troughs and adapted to receive the threshed material from the threshing means, means to conduct forwardly to the ends of the troughs the material passing through the screens, lateral conveying means in the troughs in front of the said screens and to which the material is delivered, and elevators to which the said lateral conveying means deliver the material.

6. In a pea and bean separator of the class described having a body in which, at the sides, the threshed peas or the like are received, longitudinally disposed screens in the body at the sides in position to receive the peas or the like, endless conveyers disposed longitudinally in the body with the upper runs thereof traveling over the screens and the under runs thereof beneath the screens, transverse shafts at the ends of the screens, sprockets on said shafts over which the conveyers run, means for driving one of said shafts, and means to vibrate the screens from the other of said shafts.

7. In a pea and bean separator of the class described having a body in which, at the sides, the threshed peas or beans are received; longitudinally disposed screens in said body at the sides in position to receive the peas or beans, a transverse shaft at the rear ends of the screens, a transverse shaft at the front end of the screen, sprockets on said shafts, endless conveyers running over said sprockets and having upper and lower runs, respectively above and below the screens, a third transverse shaft adjacent to the second mentioned shaft, transverse conveyers on the third shaft in front of the endless conveyers and adapted to receive the peas or beans from the latter, and means whereby said shafts may be driven.

GEORGE E. PRITCHARD.